(12) United States Patent
Tang et al.

(10) Patent No.: US 11,401,191 B2
(45) Date of Patent: Aug. 2, 2022

(54) MOLD AND APPARATUS FOR FORMING GLASS PRODUCT, AND METHOD OF PROCESSING GLASS PRODUCT

(71) Applicant: AAC Optics Solutions Pte. Ltd., Singapore (SG)

(72) Inventors: Tsz Lok Keith Tang, Hong Kong (CN); Thomas Aabo, Albertslund (DK); Jacob Kibsgaard Kjær, Søborg (DK); Peter Krohne Nielsen, Hillerød (DK); Simon Bo Jensen, Hillerød (DK); Michal Sobol, København (PL); Niels Christian Roemer Holme, Farum (DK); Bingke Zhu, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 148 days.

(21) Appl. No.: 16/810,880

(22) Filed: Mar. 6, 2020

(65) Prior Publication Data

US 2021/0214263 A1 Jul. 15, 2021

(30) Foreign Application Priority Data

Jan. 9, 2020 (CN) .......................... 202010023831.6

(51) Int. Cl.
*C03B 11/08* (2006.01)
*C03B 19/14* (2006.01)

(52) U.S. Cl.
CPC .............. *C03B 11/08* (2013.01); *C03B 19/14* (2013.01)

(58) Field of Classification Search
None
See application file for complete search history.

(56) References Cited

U.S. PATENT DOCUMENTS 10,518,446 B1 * 12/2019 Jenkins ............... B29C 45/7331

FOREIGN PATENT DOCUMENTS

CN 209178234 U * 7/2019
JP 2006232635 A * 9/2006 ............. C03B 11/08

* cited by examiner

Primary Examiner — Lisa L Herring
(74) Attorney, Agent, or Firm — W&G Law Group (57) ABSTRACT

A mold includes a lower mold core and an upper mold core. The lower mold core has a first outside surface and a first molding surface including a first molding portion and a first supporting portion surrounding the molding portion. The upper mold core has a second molding surface opposite to the first molding surface and encloses a molding cavity with the first molding surface. The lower mold core includes a first gas inlet on the first outside surface, a first gas outlet on the first supporting portion, and a first gas channel in the lower mold core, the first gas channel connecting the first gas inlet and the first gas outlet. Gas flow out from the first gas outlet to separate the glass product from the lower mold core before the glass product is completely cooled down, which can avoid many adverse effects during the glass product process.

14 Claims, 9 Drawing Sheets

MOLD AND APPARATUS FOR FORMING GLASS PRODUCT, AND METHOD OF PROCESSING GLASS PRODUCT

TECHNICAL FIELD

The disclosure relates to formations of glass products, and more particularly to a mold and apparatus for forming a glass product, and a method of processing the glass product.

BACKGROUND

Lenses are optical elements made of transparent materials (such as glass, crystal, etc.), which can be widely used in security, vehicle, digital camera, laser, optical instruments, and other fields. With the continuous expansion of the market, the application of lens is more and more extensive. Especially with the development of the Internet, various electronic devices are brought into daily lives, such as mobile phones, tablet computers, laptops, etc. Specification requirements of lens applied in those electronic devices are also highly increased.

In the related art, the wafer lenses made of glass materials are generally produced by a glass processing mold through thermoforming. When the glass processing mold is closed, preset cavities will be enclosed inside the glass processing mold, the cavities can help shape the heated glass substrate, and then the glass substrate is cooled to form glass products with a preset shape. The glass product will be directly attached to a bottom forming surface of the mold due to gravity, further to cool.

However, the processing of the glass processing mold in the related art has following problems.

Figure 1:
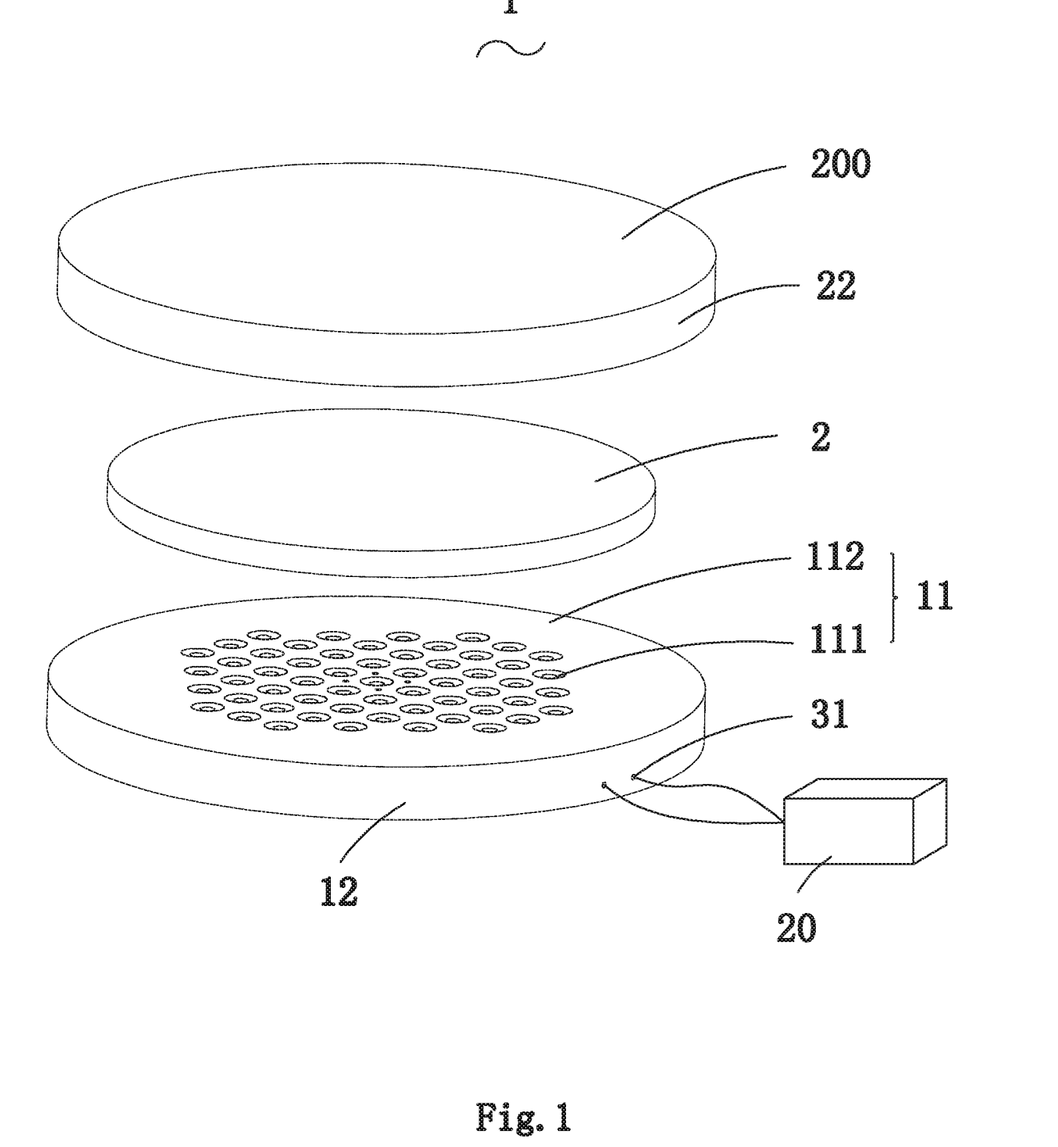
FIG. 1 is an exploded view of one exemplary embodiment of a mold.
Figure 2:
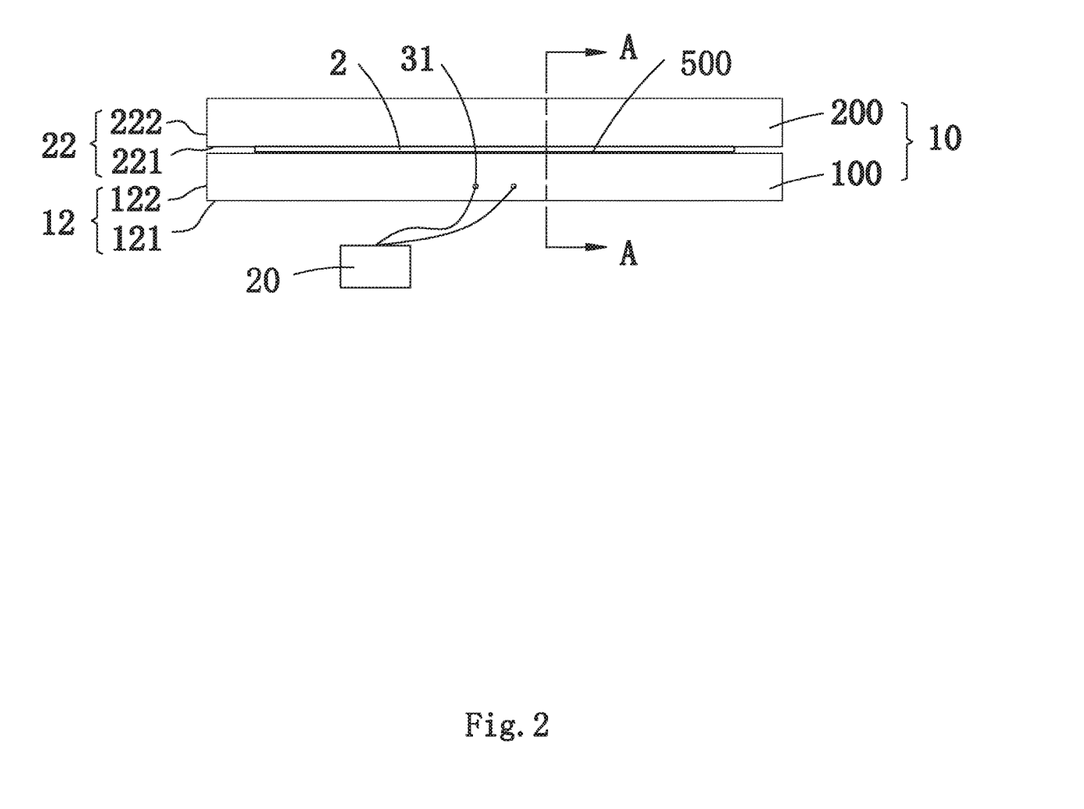
FIG. 2 is a side view of one exemplary embodiment of a mold.
Figure 3:
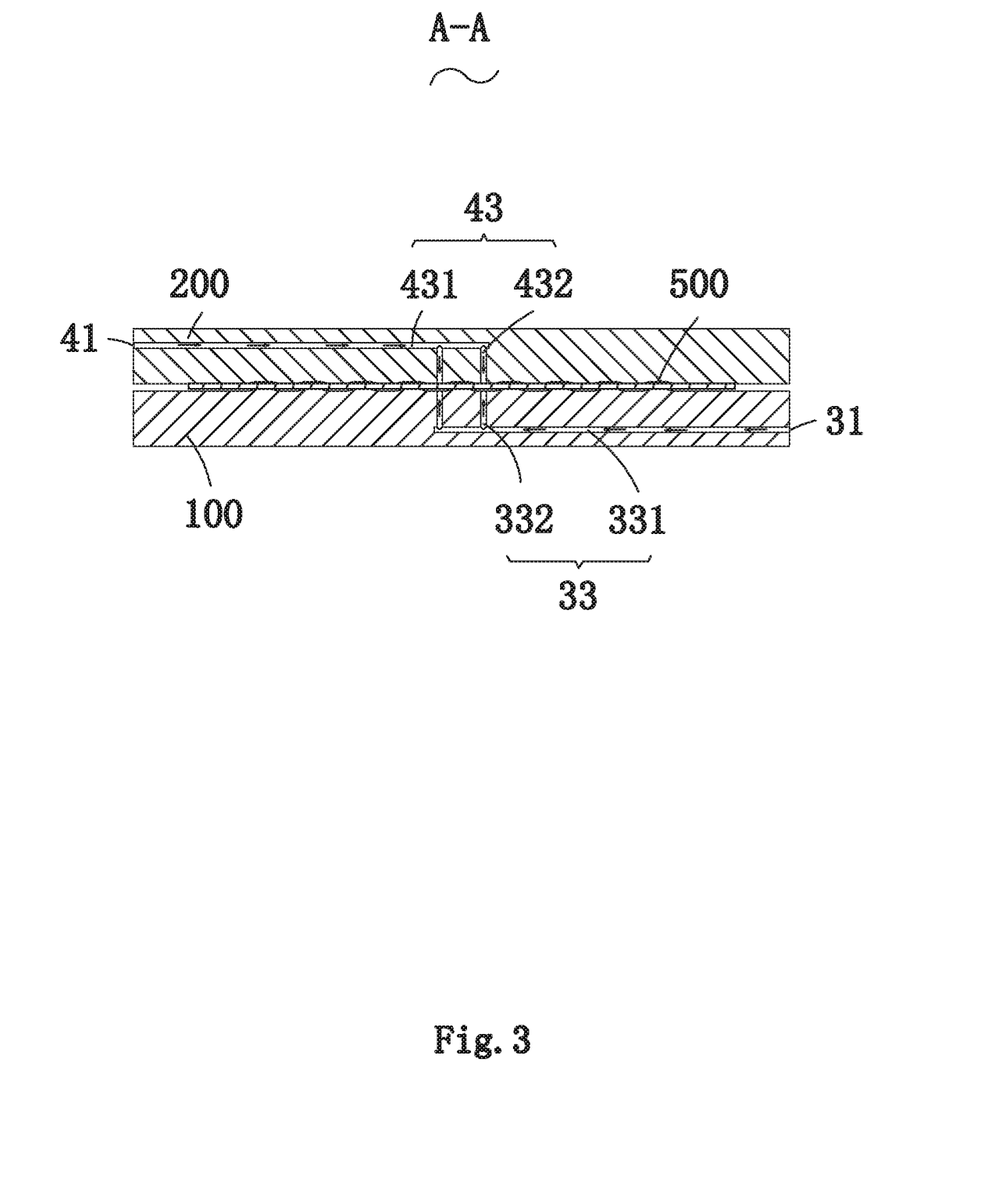
FIG. 3 a sectional view taken along line A-A of FIG. 2.
Figure 4:
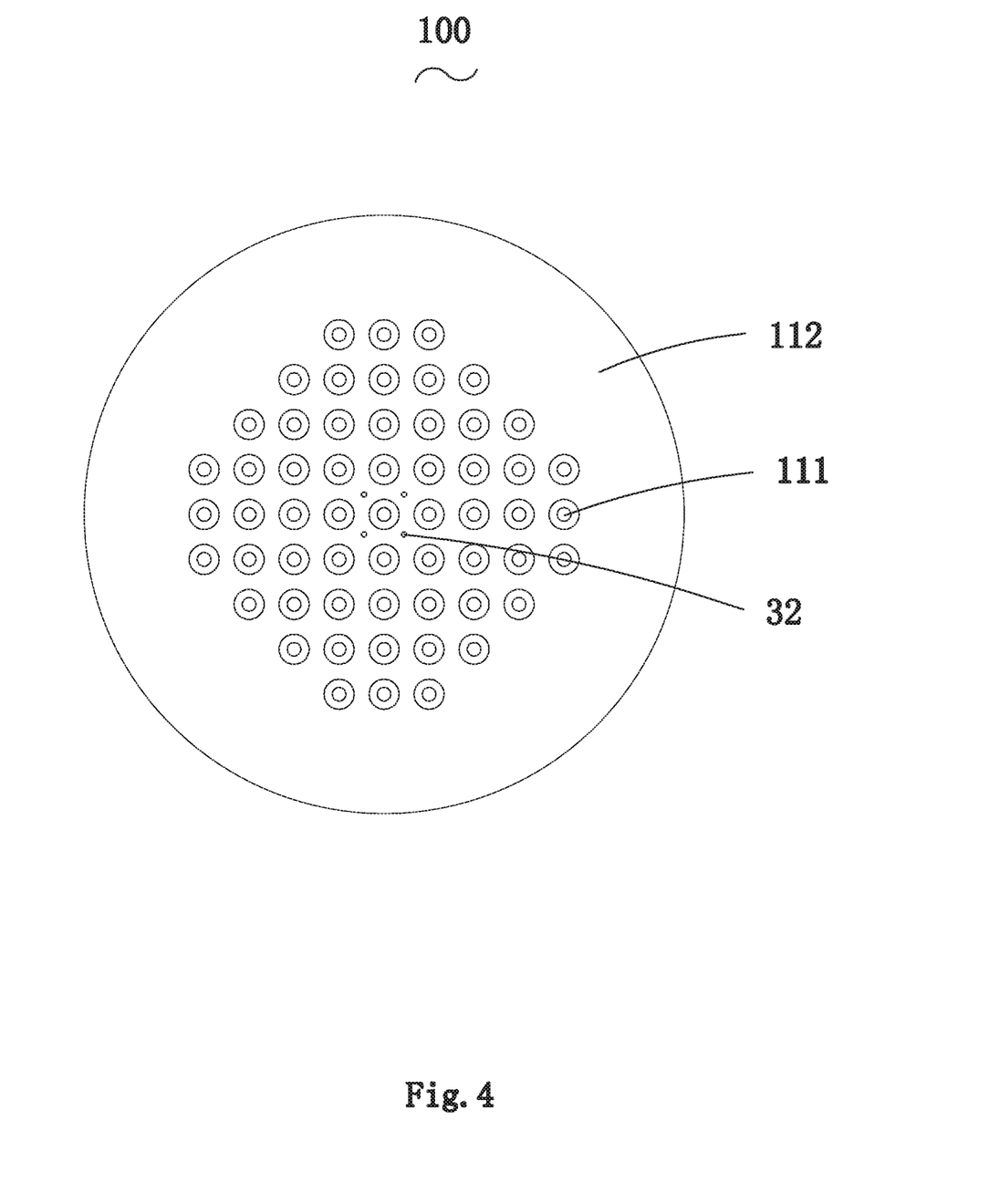
FIG. 4 is a top view of one exemplary embodiment of a lower mold core.
Figure 5:
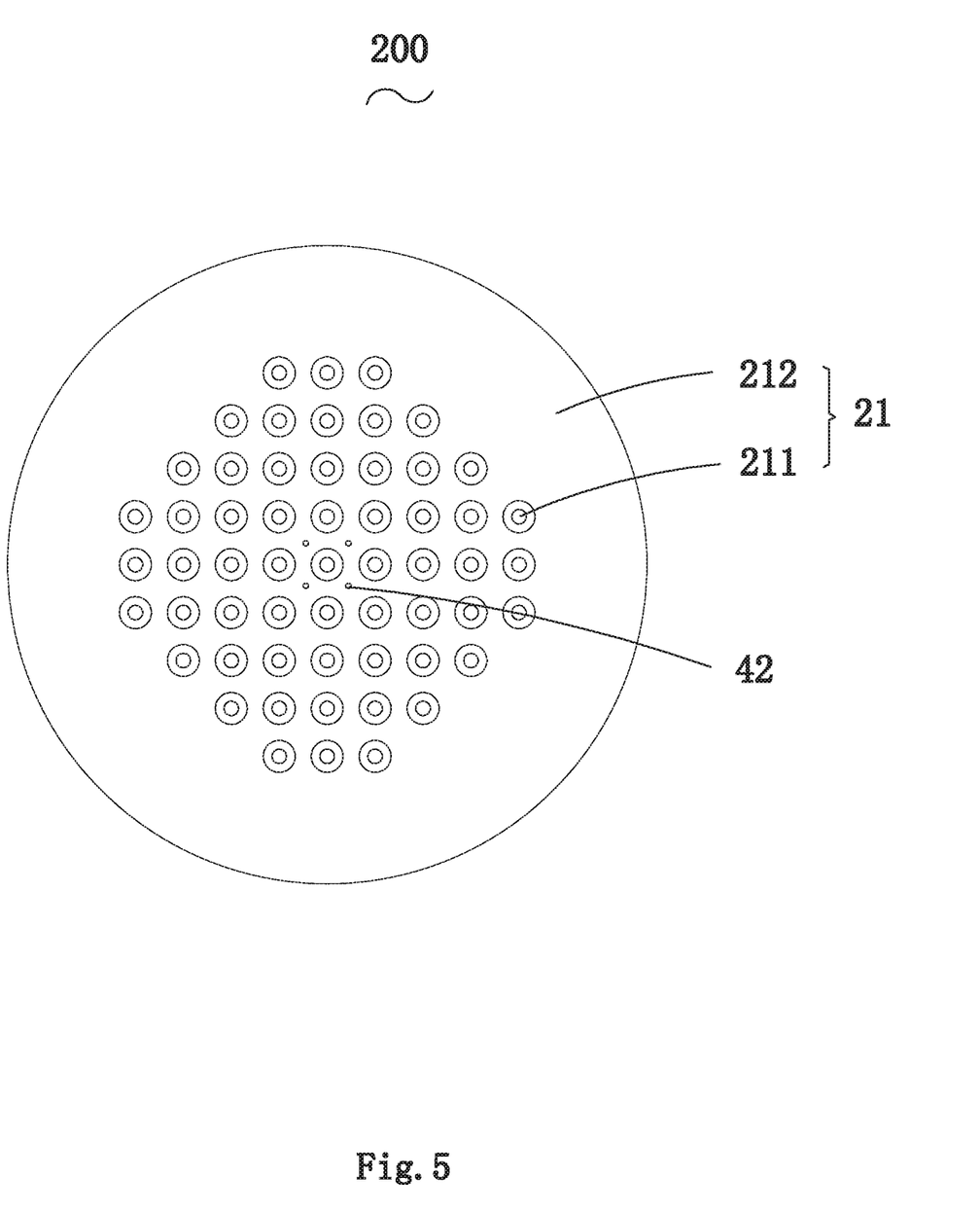
FIG. 5 is a vertical view of one exemplary embodiment of an upper mold core.
Figure 6:
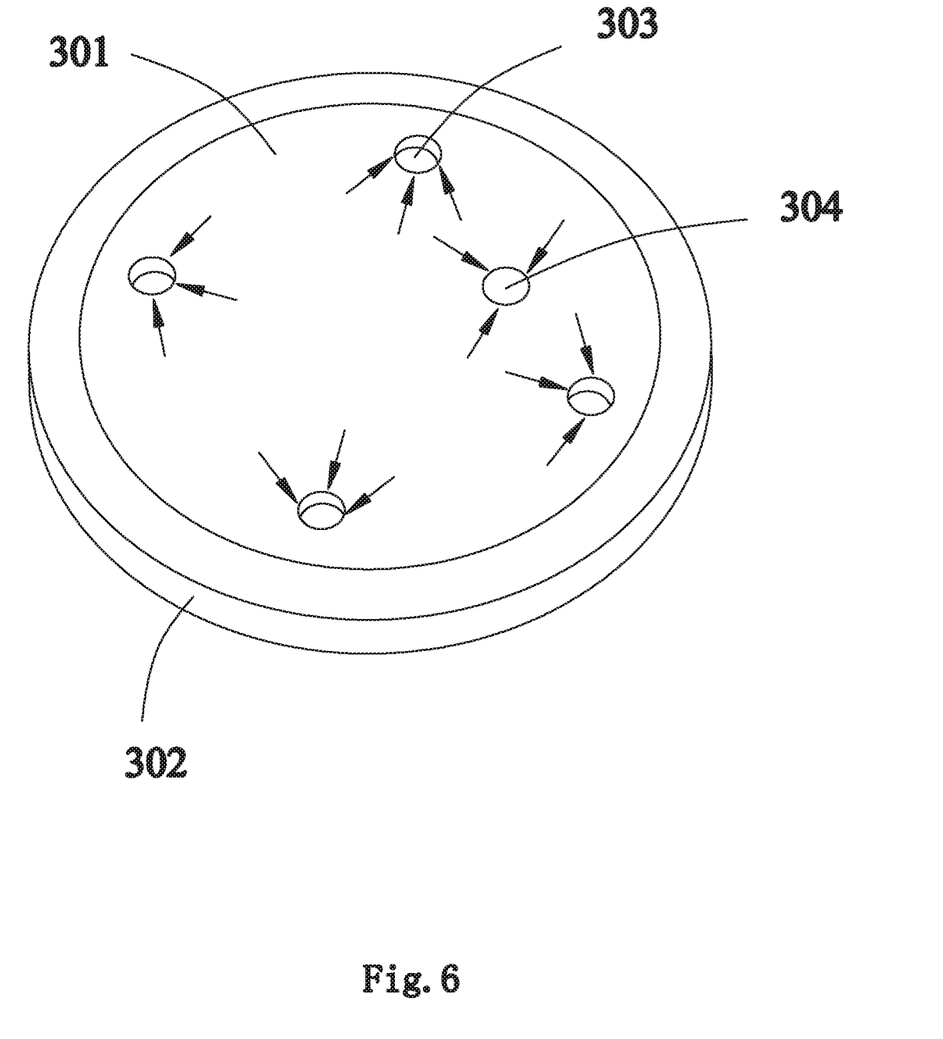
FIG. 6 is a schematic diagram of a glass product and a mold in a prior art.
Figure 7:
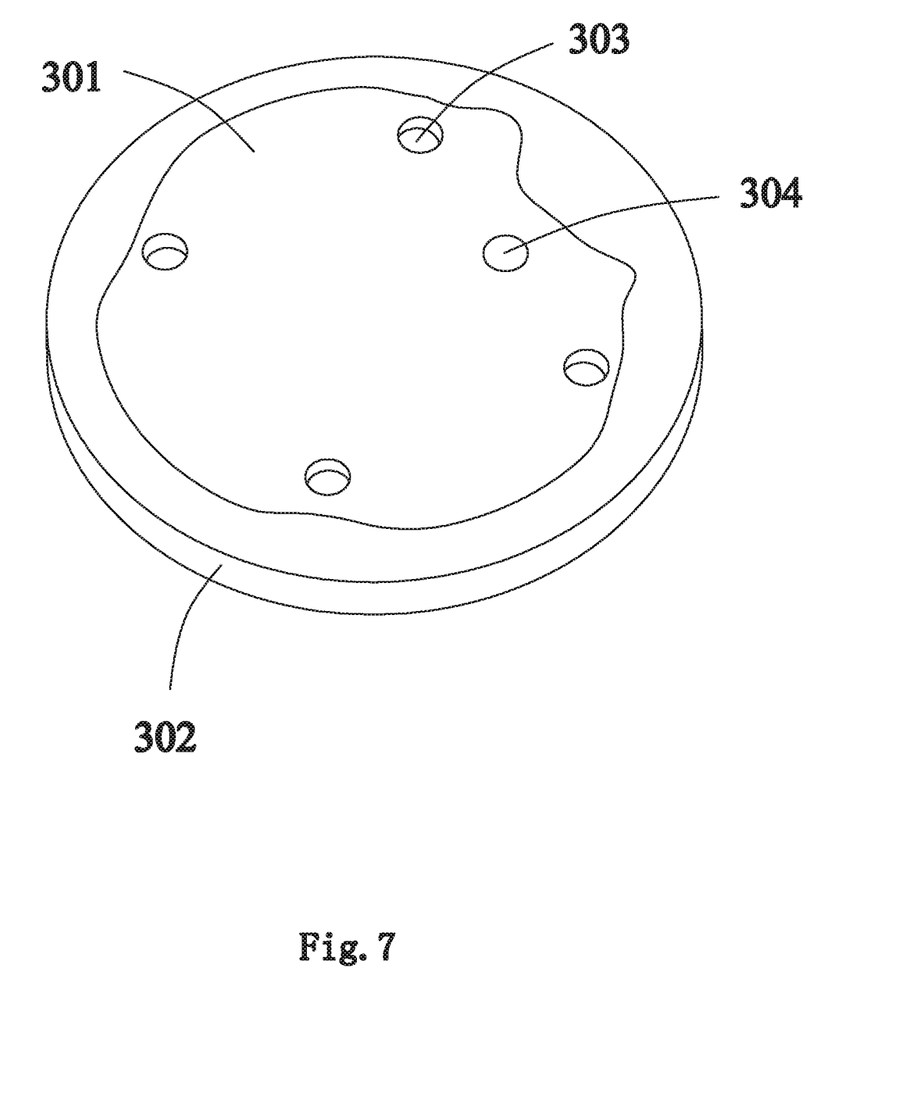
FIG. 7 is a diagrammatic view of the deformation of the glass product due to uneven heat distribution of FIG. 6.

Firstly, at the last step of the molding process, the glass product 301 may be stuck together with the feature points 303 (namely the point where the lens is formed) of the mold 302, or it may be stuck together with the mold at a random point 304 (namely any point of the forming surface) to form a point contact. As shown in FIG. 6, where an arrow represents the shrinkage direction of the glass product 301. Contacting area of the glass product 301 contacting with the mold 302 tends to cool faster than the rest area of the glass product 301, and it may cause an uneven shrinkage across the glass product 301, leading to a deformation of the glass product 301, as shown in FIG. 7.

Secondly, in the forming process, the glass product 301 shows a strong adhesion to the mold surface. Although adhesion will gradually reduce during the cooling process, it takes a long time for the glass product 301 to completely cool down that leads to an auto release, thus increasing the cost. Besides, if the adhesion is too strong, the glass product 301 tends to crack.

Figure 8:
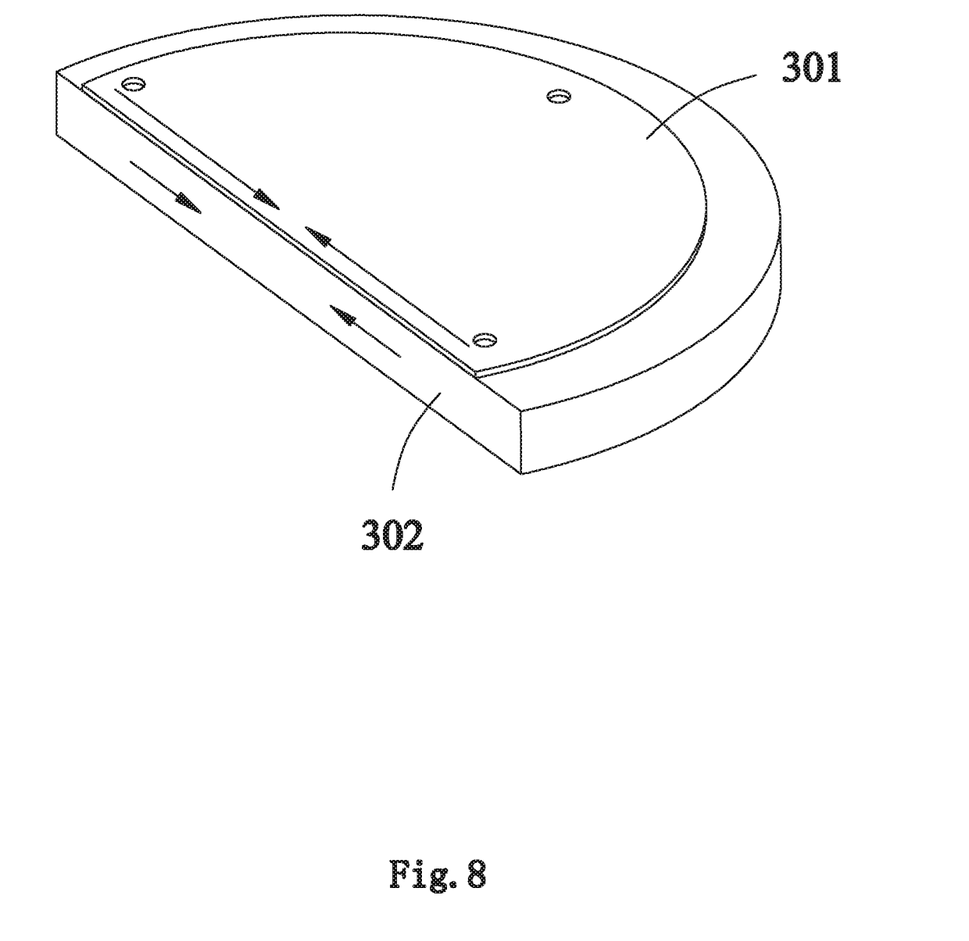
FIG. 8 is a diagrammatic view of the glass product and the mold being contracted of FIG. 6.
Figure 9:
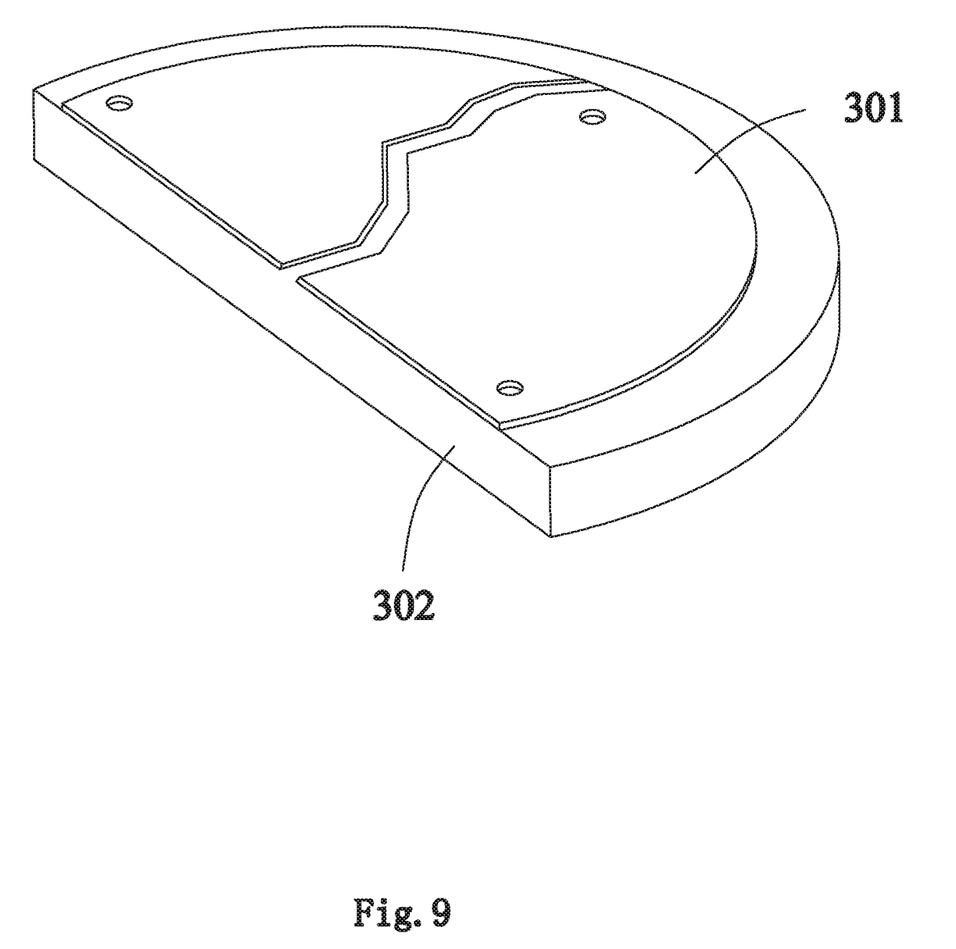
FIG. 9 is a diagrammatic view of the broken glass product due to contracted difference of FIG. 6.

Thirdly, the mold 302 having features with a large angle will increase the risk of breakage of the glass product 301 during the process of shrinkage, because the shrinkage rate of the glass product 301 during the cooling process is greater than that of the mold 302, and the feature with a large angle of the mold 302 will prevent the glass product 301 from freely shrinking in the horizontal direction. The larger the diameter of the glass product is, the greater the impact becomes. Because the thermal expansion coefficient of the glass product 301 is larger than that of the mold 302, the glass product 301 shrinks more, as shown in FIG. 8. Where an arrow indicates the shrinkage direction of the glass product 301 and the mold 302, when the strain caused by the shrinkage difference between the mold 302 and the glass product 301 goes beyond the strain that the glass product 301 can sustain, the glass product 301 will crack, as shown in FIG. 9.

Therefore, it is necessary to provide an improved mold to solve the above problems.

SUMMARY

One of the objectives of the disclosure is to provide mold that can make the glass product cool down evenly without preventing the natural shrinkage of the glass product.

One of the objectives of the disclosure is realized by adopting the following technical scheme:

A mold for forming a glass product includes a lower mold core and an upper mold core, the lower mold core includes a first molding surface and a first outside surface; the first molding surface includes a first molding portion for forming a glass product and a first supporting portion surrounding the molding portion; the upper mold core includes a second molding surface; the first molding surface is formed on one side of the lower mold core adjacent to the upper mold core; the second molding surface is formed on one side of the upper mold core adjacent to the lower mold core; the second molding surface is opposite to the first molding surface; a molding cavity is enclosed by the first molding surface and the second molding surface; the lower mold core includes a first gas inlet formed on the first outside surface, a first gas outlet formed on the first supporting portion, and a first gas channel formed in the lower mold core; and the first gas channel is communicated with the first gas inlet and the first gas outlet.

Typically, the first outside surface comprises a first bottom wall opposite to the first forming surface, and a first outside wall extending from an edge of the first bottom wall toward the first forming surface; and the first outside wall is connected to the first forming surface; the first gas inlet is formed on the first outside wall; the first gas channel includes a first channel extending from the first gas inlet to the lower mold core in a radial direction of the lower mold core, and a second channel extending from the first gas outlet to the lower mold core in a thickness direction of the lower mold core; and the second channel is communicated with the first channel.

Typically, the lower mold core includes at least two of the first gas outlets disposed at intervals on the first supporting portion; the first gas channel includes at least two second channels; and each first gas outlet corresponds to one second channel.

Typically, the first molding surface includes at least two first molding portions separated from each other; the first gas outlet is located between two adjacent first molding portions.

Typically, the first molding surface includes a plurality of first molding portions arranged in an array arrangement, and the first gas outlet is formed on a center region of the first molding surface.

Typically, an outline of the first molding surface is circular; and the lower mold core includes a plurality of first gas outlets; and the plurality of first gas outlets surrounds a center of the first molding surface, a distance between each two adjacent first gas outlets is the same.

Typically, the lower mold core further includes a second outside surface disposed outside the molding cavity; the second molding surface includes a second molding portion corresponding to the first molding portion and a second supporting portion surrounding the second molding portion; the upper mold core includes a second gas inlet formed on the second outside surface, a second gas outlet formed on the second supporting portion, and a second gas channel formed in the upper mold core; and the second gas channel is communicated with the second gas inlet and the second gas outlet.

The disclosure also provides a glass product forming apparatus, the glass product forming apparatus includes the above-mentioned mold and a gas supply mechanism configured to supply gas into the first gas channel through the first gas inlet.

Still, the disclosure also provides a method of processing the glass product, the method including:

providing the above-mentioned glass product forming apparatus and a glass substrate;

placing the glass substrate into the molding cavity to form a glass product corresponding to the first molding portion on the glass substrate;

transmitting gas into the first gas channel by the gas supply mechanism through the first gas inlet when a temperature of the glass product drops in a glass transition temperature, the gas flowing out from the first gas outlet to separate the glass substrate from the lower mold core; and cooling the glass product.

Typically, the first molding surface includes a plurality of first molding portions separated from each other; the glass products correspond to the first molding portions; after the step of cooling the glass product, the method further includes a step of cutting the glass substrate to obtain the glass products after the glass products being cooled down.

Transmits gas into the first gas channel by the gas supply mechanism through the first gas inlet when a temperature of the glass product dropping below a glass transition temperature, the inert gas flowing from the first gas outlet to separate the glass substrate from the lower mold core. In this way, the glass product does not contact the lower mold core, any features that are present at the lower mold core won't be able to stop the natural shrinkage of the glass product. Besides, separates the glass product from the mold before the glass product fully cool down, thus the mold can mold the next glass substrate, which can greatly increase production efficiency and shorten the cycle time during production.

DETAILED DESCRIPTION OF THE PREFERRED EMBODIMENTS

The disclosure is described in detail below in combination with FIGS. 1 to 5.

As shown in FIGS. 1-5, an embodiment of the disclosure provides a glass product forming apparatus 1 including a mold 10 for forming a glass product and a gas supply mechanism 20. The mold 10 includes a lower mold core 100 and an upper mold core 200. The lower mold core 100 includes a first outside surface 12 and a first molding surface 11 including a first molding portion 111 for forming a glass product and a first supporting portion 112 surrounding the first molding portion 111. The upper mold core 200 includes a second molding surface 21. The first molding surface 11 is formed on one side of the lower mold core 100 adjacent to the upper mold core 200. The second molding surface 21 is formed on one side of the upper mold core 200 adjacent to the lower mold core 100, and the second molding surface 21 is opposite to the first molding surface 11. A molding cavity 500 is enclosed by the first molding surface 11 and the second molding surface 21. The lower mold core 100 includes a first gas inlet 31 formed on the first outside surface 12, a first gas outlet 32 formed on the first supporting portion 112, and a first gas channel 33 formed in the lower mold core 100. And the first gas channel 33 is communicated with the first gas inlet 31 and the first gas outlet 32. The gas supply mechanism 20 is configured to supply gas into the first gas channel 33 through the first gas inlet 31.

A glass substrate 2 is formed into glass product in the mold 10. Transmits gas into the first gas channel 33 by the gas supply mechanism 20 through the first gas inlet 31 when a temperature of the glass product dropping below a glass transition temperature, the inert gas flowing out from the first gas outlet 32 to separate the glass substrate 2 from the first supporting portion 112. It is possible to remove the glass product from first supporting portion 112 without moving mechanical components, such as ejector pins and ejector grid, which reduces the cost and complexity of the mold 10 In this way, the glass product does not contact the first supporting portion 112 during the cooling process, which eliminates the influence caused by the difference in the thermal expansion between the glass product and the mold 10, thus making the cooling of the glass product more uniform. Furthermore, because the glass product does not contact the first supporting portion 112, any features that are present at the lower mold core 100 won't be able to stop the natural shrinkage of the glass product, and the quality of the glass product is assured. Besides, separates the glass product from the mold 10 before the glass product fully cool down, thus the mold 10 can mold the next glass substrate 2, which can greatly increase production efficiency and shorten the cycle time during production. In particular, the glass product can be removed from lower mold core 100 at any time from when the glass product is separated from the first supporting portion 112 to when the glass product is completely cooled down.

Specifically, in one exemplary embodiment, an outline of the glass substrate 2 is circular.

Specifically, the first outside surface 12 includes a first bottom wall 121 opposite to the first forming surface 11, and a first outside wall 122 extending from an edge of the first bottom wall 121 toward the first forming surface 11 and the first outside wall 122 is connected to the first forming surface. The first gas inlet 31 is formed on the first outside wall 122 to facilitate the gas supply. The first gas channel 33 includes a first channel 331 extending from the first gas inlet 31 to the lower mold core 100 in a radial direction of the lower mold core 100, and a second channel 332 extending from the first gas outlet 32 to the lower mold core 100 in a thickness direction of the lower mold core 100. And the second channel 332 is communicated with the first channel 331. As shown by the arrow in the lower mold core 100 in FIG. 3, the gas flows in the first channel 331 via the first gas inlet 31, passes through the second channel 332, and ejects from the first gas outlet 32. In this way, the impact force of the gas pressure is lower, which can more gently push the glass product away from the first supporting portion 112.

Specifically, the lower mold core 100 includes at least two first gas outlets disposed at intervals on the first supporting portion 112. The first gas channel 33 includes at least two second channels, and each first gas outlet 32 corresponds to one second channel 332.

Typically, the first molding surface 11 includes at least two first molding portions separated from each other, therefore at least two glass products can be formed on the glass substrate 2, which is conducive to improving the production efficiency. The first gas outlet 32 is located between the two adjacent first molding portions.

Typically, the first molding surface 11 includes a plurality of first molding portions arranged in an array arrangement which is conducive to the segmentation of glass products after forming. The first gas outlet 32 is formed on a center region of the first molding surface 11. Thereby the gas can diffuse from the center of the first molding surface 11 to the periphery to cool the glass product more evenly. An outline of the first molding surface 11 is circular, the lower mold core 100 includes a plurality of first gas outlet 32 surrounds a center of the first molding surface 11, a distance between each two adjacent first gas outlet 32 is the same.

Typically, in one exemplary embodiment, the lower mold core 100 includes two first gas inlets, two first channels, four second channels and four first gas outlets, each first gas inlet 31 is communicated with one first channel 331, each first channel 331 is communicated with two second channel 332, and each second channel 332 is communicated with a first gas outlet 32. The four first gas outlets surrounds a center of the first molding surface 11, and a distance between each two adjacent first gas outlet 32 is the same. The gas flow from the four first gas outlets act on a glass product, thus the glass product has more stress points and force exerted on the glass product is more uniform. And the glass product can be smoothly separated from the first supporting portion 112. Understandably, a number of first gas outlets is changeable according to the actual situation, for example, six, eight and ten or more other numbers are also possible.

Typically, the upper mold core 200 further includes a second outside surface 22 disposed outside the molding cavity 500. The second outside surface 22 includes a second bottom wall 221 opposite to the second forming surface 21, and a second outside wall 222 extending from the edge of the second bottom wall 221 toward the second forming surface 21. And the second outside wall 222 connected to the second forming surface. The second molding surface 21 includes a second molding portion 211 corresponding to the first molding portion 111 and a second supporting portion 212 surrounding the second molding portion 211. The upper mold core 200 includes a second gas inlet 41 formed on the second outside surface 22, a second gas outlet 42 formed on the second supporting portion 212, and a second gas channel 43 formed in the upper mold core 200. And the second gas channel 43 is communicated with the second gas inlet 41 and the second gas outlet 42. The second gas inlet 41 is formed the second outside wall 222 to facilitate the gas supply. The second gas channel 43 includes a third channel 431 extending from the second gas inlet 41 into the upper mold core 200 in a radial direction of the upper mold core 200, and a fourth channel 432 extending from the second gas outlet 42 into the upper mold core 200 in a thickness direction of the upper mold core 200. The fourth channel 432 is communicated with the third channel 431. As shown by the arrow in the upper mold core 200 in FIG. 3, the gas flows in the third channel 431 via the second gas inlet 41, passes through the fourth channel 432, and ejects from the second gas outlet 42. In this way, the impact force of the gas pressure is lower, which can more gently push the glass product away from the second supporting portion 212.

Specifically, the upper mold core 200 includes at least two of the second gas outlets disposed at intervals on the second supporting portion 212. The second gas channel 43 includes at least two fourth channels, and each second gas outlet 42 corresponds to one fourth channel 432.

Typically, the second molding surface 21 includes at least two second molding portions separated from each other, therefore at least two glass products can be formed on the glass substrate 2, which is conducive to improving the production efficiency. The second gas outlet 42 is located between the two adjacent second molding portions.

Typically, the second molding surface 21 includes a plurality of second molding portions arranged in an array arrangement which is conducive to the segmentation of glass products after forming. And the second gas outlet 42 is formed on a central region of the second molding surface 21. Thereby the gas can diffuse from the center of the second molding surface 21 to the periphery to cool the glass product more evenly. An outline of the second molding surface 21 is circular, the upper mold core 200 includes a plurality of second gas outlet 42 disposed surrounds a circle of the second molding surface 21, a distance between each two adjacent second gas outlet 42 is the same.

Typically, in one exemplary embodiment, the upper mold core 200 includes two second gas inlets, two third channels, four fourth channels and four second gas outlets, each second gas inlet 41 is communicated with one third-channel, each third-channel is communicated with two fourth channel 432, and each fourth channel 432 is communicated with a second gas outlet 42. The four second gas outlets surrounds a center of the second molding surface 21, a distance between each two adjacent second gas outlet 42 is the same. The gas flow from the four second gas outlets act on a glass product, thus the glass product has more stress points and force exerted on the glass product is more uniform. And the glass product can be smoothly separated from the second supporting portion 212. Understandably, a number of second gas outlets is changeable according to the actual situation, for example, six, eight and ten or more other numbers are also possible.

The disclosure also provides a method of processing a glass product, the method including following steps.

The method includes providing the aforesaid glass product forming apparatus 1 and a glass substrate 2;

The method further includes placing the glass substrate 2 into the molding cavity 500 to form a glass product corresponding to the first molding portion 111 on the glass substrate at a temperature higher than the glass transition temperature;

The method further includes transmitting gas into the first gas channel 33 by the gas supply mechanism 20 through the first gas inlet 31, when a temperature of the glass product drops in a glass transition temperature, the gas flowing out from the first gas outlet 32 to separate the glass substrate from the lower mold core 100; and The method also includes cooling the glass product.

The glass transition temperature refers to a temperature at which the glass can transform from a high elastic state to a glass state or from a glass state to a high elastic state. The glass product is in a high elastic state in an environment higher than the glass transition temperature, at this time, the glass product is easily deformed in the presence of an external force. The glass product is in a glass state in the environment lower than the glass transition temperature, at this time, the glass product has certain rigidity, it is difficult to deform even in the presence of an external force. Therefore, only when the temperature of the glass product drops in the glass transition temperature, can the gas be supply into the first gas channel 33 through the first gas inlet 31, so as to avoid the deformation of the glass product caused by the gas pressure.

Typically, the first molding surface 11 includes a plurality of first molding portions separately from each other; the glass products correspond to the first molding portions; after the step of cooling the glass product, the method further includes a step of cutting the glass substrate to obtain the glass products after the glass products being cooled down.

Based on the method of the disclosure, when the temperature of the glass product drops in a glass transition temperature value, the glass product is quickly and steadily separated from the mold 10, thereby eliminating the various potential factors that cause the glass product after molding and before cooling to become defective due to the contact between the glass product and the mold 10. The molded glass product is completely independent of the mold 10, so the glass product is cooled more uniformly and the quality of the glass product is assured. Besides, since the molded glass product is completely independent of the mold 10, the cooling speed of the glass product is accelerated, which can shorten the production cycle of the glass product.

The above embodiments are only the preferred embodiments of the present invention, and do not limit the scope of the present invention. A person skilled in the art may make various other corresponding changes and deformations based on the described technical solutions and concepts. And all such changes and deformations shall also fall within the scope of the present invention.

What is claimed is:

1. A mold for forming a glass product, comprising:
a lower mold core comprising:
a first molding surface; and
a first outside surface; and
an upper mold core comprising a second molding surface;
wherein the first molding surface comprises a first molding portion for forming the glass product and a first supporting portion surrounding the first molding portion; the first molding surface is formed on one side of the lower mold core adjacent to the upper mold core; the second molding surface is formed on one side of the upper mold core adjacent to the lower mold core; the second molding surface is opposite to the first molding surface; a molding cavity is enclosed by the first molding surface and the second molding surface; the lower mold core comprises a first gas inlet formed on the first outside surface, a first gas outlet formed on the first supporting portion, and a first gas channel formed in the lower mold core; and the first gas channel is communicated with the first gas inlet and the first gas outlet; wherein the first molding surface comprises at least two first molding portions separated from each other; the first gas outlet is located between two adjacent first molding portions; the first molding surface comprises a plurality of first molding portions arranged in an array arrangement, and the first gas outlet is formed on a center region of the first molding surface.

2. The mold of claim 1, wherein the first outside surface comprises a first bottom wall opposite to the first forming surface, and a first outside wall extending from an edge of the first bottom wall toward the first forming surface; and the first outside wall is connected to the first forming surface; the first gas inlet is formed on the first outside wall; the first gas channel comprises a first channel extending from the first gas inlet to the lower mold core in a radial direction of the lower mold core, and a second channel extending from the first gas outlet to the lower mold core in a thickness direction of the lower mold core; and the second channel is communicated with the first channel.

3. The mold of claim 2, wherein the lower mold core comprises at least two first gas outlets disposed at intervals on the first supporting portion; the first gas channel comprises at least two second channels; and each first gas outlet corresponds to one second channel.

4. The mold of claim 1, wherein an outline of the first molding surface is circular; and the lower mold core comprises a plurality of first gas outlets; and the plurality of first gas outlets surrounds a center of the first molding surface, a distance between each two adjacent first gas outlets is the same.

5. The mold of claim 1, wherein the upper mold core further comprises a second outside surface disposed outside the molding cavity; the second molding surface comprises a second molding portion corresponding to the first molding portion and a second supporting portion surrounding the second molding portion; the upper mold core comprises a second gas inlet formed on the second outside surface, a second gas outlet formed on the second supporting portion, and a second gas channel formed in the upper mold core; and the second gas channel is communicated with the second gas inlet and the second gas outlet.

6. A glass product forming apparatus comprising:
the mold of claim 1, and
a gas supply to supply gas into the first gas channel through the first gas inlet.

7. The glass product forming apparatus of claim 6, wherein the first outside surface comprises a first bottom wall opposite to the first forming surface, and a first outside wall extending from an edge of the first bottom wall toward the first forming surface; and the first outside wall is connected to the first forming surface; the first gas inlet is formed on the first outside wall; the first gas channel comprises a first channel extending from the first gas inlet to the lower mold core in a radial direction of the lower mold core, and a second channel extending from the first gas outlet to the lower mold core in a thickness direction of the lower mold core;
and the second channel is communicated with the first channel.

8. The glass product forming apparatus of claim 7, wherein the lower mold core comprises at least two first gas outlets disposed at intervals on the first supporting portion; the first gas channel comprises at least two second channels; and each first gas outlet corresponds to one second channel.

9. The glass product forming apparatus of claim 6, wherein an outline of the first molding surface is circular; and the lower mold core comprises a plurality of first gas outlets; and the plurality of first gas outlets surrounds a center of the first molding surface, a distance between each two adjacent first gas outlets is the same.

10. The glass product forming apparatus of claim 6, wherein the upper mold core further comprises a second outside surface disposed outside the molding cavity; the second molding surface comprises a second molding portion corresponding to the first molding portion and a second supporting portion surrounding the second molding portion; the upper mold core comprises a second gas inlet formed on the second outside surface, a second gas outlet formed on the second supporting portion, and a second gas channel formed in the upper mold core; and the second gas channel is communicated with the second gas inlet and the second gas outlet.

11. A method of processing a glass product, comprising:
providing a glass product forming apparatus of claim 8 and a glass substrate;
placing the glass substrate into the molding cavity to form a glass product corresponding to the first molding portion on the glass substrate;
transmitting gas into the first gas channel by the gas supply through the first gas inlet when a temperature of the glass product drops in a glass transition temperature, the gas flowing out from the first gas outlet to separate the glass substrate from the lower mold core; and
cooling the glass product.

12. The method of claim 11, wherein the glass products correspond to the first molding portions; after the step of cooling the glass product, the method further comprises a step of cutting the glass substrate to obtain the glass products after the glass products being cooled down.

13. The method of claim 11, wherein the first outside surface comprises a first bottom wall opposite to the first forming surface, and a first outside wall extending from an edge of the first bottom wall toward the first forming surface; and the first outside wall is connected to the first forming surface; the first gas inlet is formed on the first outside wall; the first gas channel comprises a first channel extending from the first gas inlet to the lower mold core in a radial direction of the lower mold core, and a second channel extending from the first gas outlet to the lower mold core in a thickness direction of the lower mold core; and the second channel is communicated with the first channel.

14. The method of claim 13, wherein the lower mold core comprises at least two first gas outlets disposed at intervals on the first supporting portion; the first gas channel comprises at least two second channels; and each first gas outlet corresponds to one second channel.

* * * * *